United States Patent [19]
Zane et al.

[11] 3,924,426
[45] Dec. 9, 1975

[54] LOCK FOR BICYCLES AND THE LIKE

[76] Inventors: Ernest Zane; Michael S. Zane, both of 85 Dean Road, Brookline, Mass. 02146

[22] Filed: Nov. 23, 1973

[21] Appl. No.: 418,427

[52] U.S. Cl. ............................................. 70/18; 70/9
[51] Int. Cl.² ........................................ E05B 73/00
[58] Field of Search ............... 70/14, 15, 18, 54–56, 70/259, 417, 6–13

[56] References Cited
UNITED STATES PATENTS

| | | | |
|---|---|---|---|
| 1,503,210 | 7/1924 | Shannon | 70/18 |
| 3,756,008 | 9/1973 | Smith | 70/18 X |

*Primary Examiner*—Robert L. Wolfe
*Attorney, Agent, or Firm*—Morse, Altman, Oates & Bello

[57] ABSTRACT

A bolt is locked against axial or longitudinal displacement by means of a rotatable locking unit. The locking unit is mounted within an enclosure and, in the preferred embodiment, is key-operated. The unit includes a pair of locking cams adapted to be rotated into locking engagement with a pair of cooperating holes formed near the end of the bolt. The bolt is fed through a slot in a housing whereupon the cams are turned and locked into position to prevent removal of the bolt. In a preferred form of the invention the housing is fixed to one leg of a U-shaped shackle with the bolt passing through a slot formed in another leg of the shackle to provide a locking mechanism for bicycles and the like. The bolt and shackle are of heavy stock, high strength metal so as to be resistant to bolt cutters and the like.

12 Claims, 15 Drawing Figures

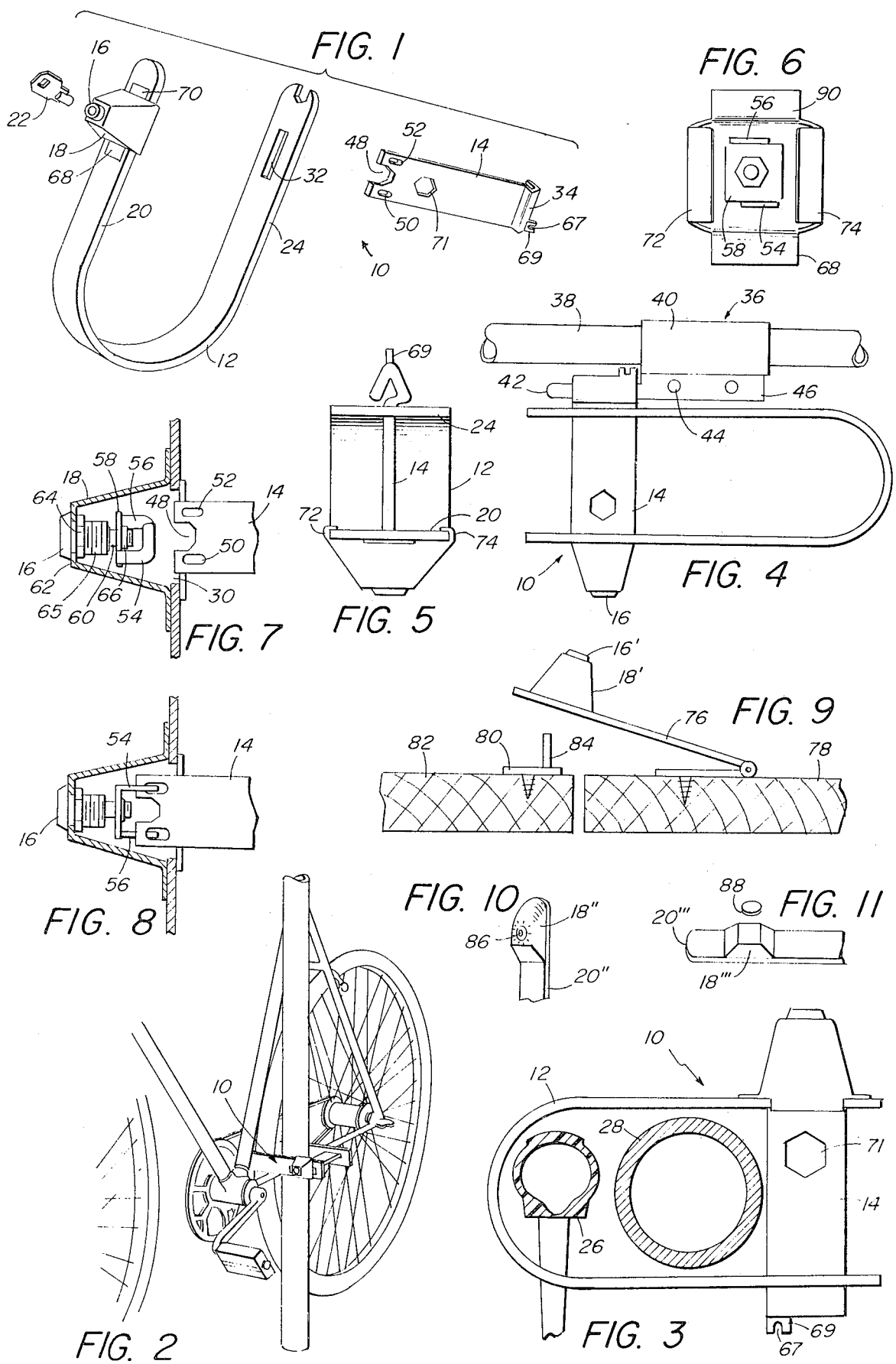

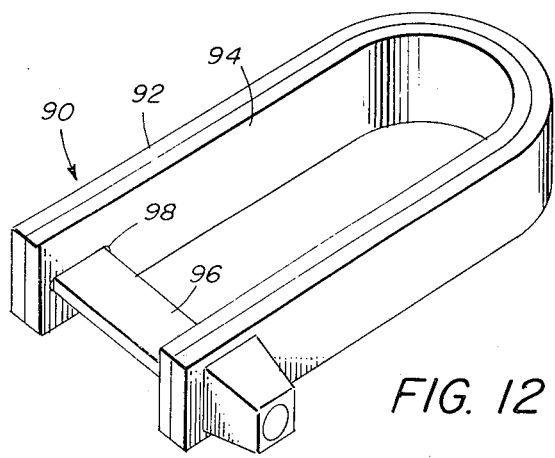
FIG. 12
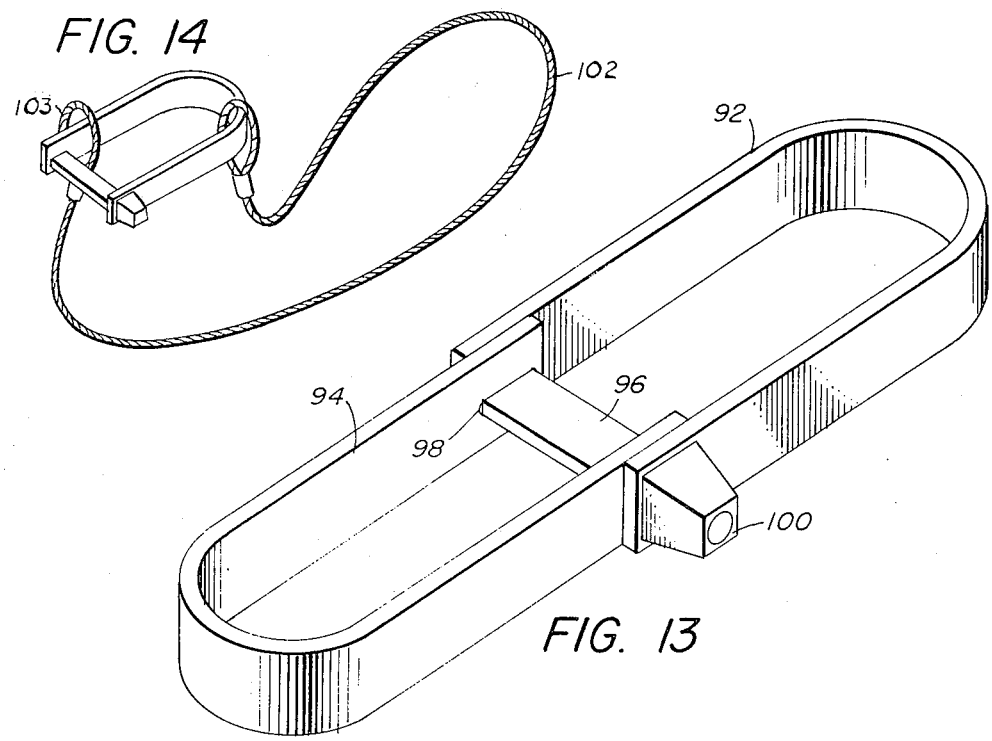
FIG. 14
FIG. 13
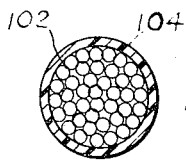
FIG. 15

3,924,426

LOCK FOR BICYCLES AND THE LIKE

BACKGROUND OF THE INVENTION

1. Field of the Invention

This invention relates generally to locking devices and more particularly is directed towards a new and improved lock having particular utility as a lock for bicycles and the like.

2. Description of the Prior Art

In co-pending application Ser. No. 241,683 filed Apr. 6, 1972 and now U.S. Pat. No. 3,800,570 by Stanley D. Kaplan under the title "Locking Mechanism" there is disclosed a bicycle lock comprised of a U-shaped shackle of heavy gauge, hardened metal which is passed through the wheel or frame of a bicycle to span a fixed pole or other support. The ends of the shackle are closed by a bolt passed through the legs of the shackle and secured by a padlock engaging the end of the bolt. The padlock is protected by a socket which prevents access by bolt cutters and the like. The foregoing locking mechanism has been found to be particularly effective in securing a bicycle against theft since it is particularly resistant to bolt cutters, hack saws and other tools commonly employed by bicycle thieves.

It is an object of the present invention to provide improvements in the foregoing lock. Another object of this invention is to provide a simple lock for bicycles and the like having an integrated locking mechanism and one which is highly resistant to bolt cutters and the like.

Still another object of this invention is to provide a locking mechanism of improved construction and design. A further object of this invention is to provide a bicycle lock and bracket therefor of unique cooperating configuration including a bolt useful as a tool, a lock part and a connector.

SUMMARY OF THE INVENTION

This invention features a locking mechanism, comprising a housing, a rotatable lock unit mounted within the housing, a pair of cooperating axially exending cams mounted to said locking device for movement from a locking to an unlocking position, and a bolt formed with a pair of holes adjacent one end thereof for locking engagement with the cams when the bolt is axially aligned and adjacent the locking unit. In the preferred embodiment of the invention, the housing is mounted on the leg of a U-shaped shackle formed with aligned slots in each leg adapted to receive the bolt to close the end of the shackle. The bolt is formed with an enlarged head opposite the hole whereby bicycles and other equipment may be secured. The enlarged end of the bolt may be tubular for mounting the lock in a stored position on a cooperating post fitted to the bicycle frame. The bolt is also formed with one or more socket openings by which it may serve as a wrench.

BRIEF DESCRIPTION OF THE DRAWINGS

FIG. 1 is an exploded view in perspective of a locking mechanism made according to the invention, FIG. 2 is a view in perspective showing the lock in use on a bicycle, FIG. 3 is a detailed enlarged sectional view of the lock in position, FIG. 4 is a view in side elevation showing the lock and storage bracket made according to the invention, FIG. 5 is an end elevation of the lock, FIG. 6 is a bottom plan view of the locking device and housing, FIG. 7 is a detailed sectional side view showing the lock and bolt in the open position, FIG. 8 is a view similar to FIG. 7 showing the lock and bolt in the locked position, FIGS. 9, 10 and 11 are fragmentary views of several modifications of the lock, FIGS. 12 and 13 are perspective views showing further modifications of the invention, FIG. 14 is a perspective view of a locking mechanism and cable attachment made according to the invention, and, FIG. 15 is a cross-sectional view of the cable shown in FIG. 14.

DETAILED DESCRIPTION OF THE PREFERRED EMBODIMENTS

Referring now to the drawings, the reference character 10 generally indicates a locking mechanism which, in the preferred embodiment, is comprised of a U-shaped shackle 12 and a bolt 14 lockable across the open end of the shackle by means of an integral lock 16 mounted in a housing or bonnet 18 fixed to the outer face of a shackle leg 20 and near the end thereof. In the illustrated embodiment, the lock 16 is operated by a key 22 and preferably the key and lock are of the cylindrical type to maximize protection against the lock being picked. In practice, the shackle and bolt, as well as the housing 18, are fabricated from a hard, tough material preferably case hardened, cold rolled steel stock on the order of perhaps 1½ inches in width and ⅛ inch in thickness. Obviously different sized stock and/or fully oil hardened tool steel or other material having similar characteristics may be used to advantage. When used as a bicycle lock, the shackle 12 typically has a length of perhaps 8 or 9 inches, the legs being spaced apart approximately 3½ to 4 inches. These dimensions are sufficient to accommodate a bicycle wheel 26 and a post 28 as suggested in FIGS. 2 and 3. The parts may be plated to prevent rusting and the shackle and the bolt preferably are covered with a layer of resilient material such as rubber, vinyl plastic or the like to prevent the lock parts from scratching the finished surfaces of the bike.

The shackle 12 is formed with two parallel legs 20 and 24, generally co-extensive with one another and each formed with a slot opening 30 and 32, respectively, to receive the bolt 14 inserted therethrough. Each of the slots 30 and 32 is dimensioned slightly greater than the cross-section of the bolt 14 in order to allow the bolt to slip easily in and out of locking position. One end of the bolt 14, as best shown in FIG. 5, is bent into a loop 34 which may be circular or triangular, for example, and which provides a stop for the bolt to prevent the leg 24 from being bent outwardly.

The loop 34 not only serves as a stop but also serves as a connector for storing the lock 10 when not in use. As best shown in FIG. 4, a bracket 36 is mounted to a part of the bicycle frame such as a crossbar 38. The bracket is comprised of a sleeve 40 fastened to the crossbar 38 or the like and formed with a post or pin 42 extending parallel to the crossbar 38. The post 42 is dimensioned to fit into the loop 34 so that the lock 10 may be stored in the manner shown in FIG. 4 when not used for locking the bicycle. The sleeve 40 of the illustrated embodiment is C-shaped in cross-section and resilient in order to permit it to be clamped over the crossbar 38. The outer ends of the sleeve 40 are then secured by screws 44 passing through flanges or plates 46 integral with the sleeve 40. The post is of cross-section to mate with the loop 34 and both the loop and post may be tapered for a wedge fit.

The end of the bolt 14 opposite the loop 34 is formed with a center notch 48 and a pair of openings 50 and 52 on either side of the notch 48. The openings 50 and 52 are provided to engage a pair of offset locking cams 54 and 56 carried by the lock 16 as best shown in FIGS. 6, 7 and 8. The locking cams 54 are in the form of L-shaped legs bent perpendicularly to and integral with a plate 58 firmly secured to the end of a barrel 60 of the lock 16. The barrel 60 is disposed within the bonnet 18 and is mounted to an outer wall 62 of the housing by means of a nut 64 engaging the threaded outer surface of a fixed sleeve 65 coaxially disposed about the barrel 60. The plates 58, in turn, is secured to the end of the barrel by a nut 66. It will be understood that the barrel 60 rotates when the key 22 is inserted in the lock and turned in one direction or the other. With the key removed, the barrel cannot be turned.

The bolt 14 is notched at 48 to provide clearance with respect to the nut 66 on the inner end of the barrel. The notch 48 preferably is hexagonal in outline to permit the bolt to be used as a wrench. A smaller spoke wrench may be formed by a notch 67 in a tab 69 at the opposite end of the bolt. Additional wrench openings may be added as at 71 or along the edge of the bolt. The locking cams 54 and 56 are in the open or unlocked position with their legs extending generally parallel with the slot 30. As shown, the legs depend from diagonally opposite corners of the plate 58 and project towards the slot with bent end portions extending in parallel but opposite directions. The bolt is locked by inserting it all the way through the slot 30 until it butts against the plate 58. In this position, the key is turned 90° this, in turn, rotating the barrel and plate along with the cams 54 and 56, the legs of which are then passed into the openings 50 and 52 effectively locking the bolt. The bolt is restricted against turning by the edges of the slot 30 and the bolt cannot be separated from the lock until the lock is turned 90° in the opposite direction.

The bonnet 18 in the illustrated embodiment is of a frustopyramidical configuration of heavy gauge steel formed with flanges 68 and 70 welded to the face of the leg 20. Side flanges 72 and 74 are crimped over the edges of the leg 20 and may also be welded to the leg.

Referring now to FIG. 9 of the drawings, there is illustrated a modification of the invention and, in this embodiment, the locking mechanism is adapted for use as a hasp-type lock with integral locking means. As shown in FIG. 9, the device is comprised of a hinged hasp 76, fastened as by screws to a support such as a door 78, and a pad 80 fastened to a support such as a wall 82. The hasp carries a bonnet 18' similar to the bonnet 18 of the principal embodiment with a lock 16' mounted therein. The lock 16' is also similar to the lock 16 of the FIGS. 7 and 8 including the locking cams which are adapted to engage cooperating holes formed in a tongue 84 fixed to the pad 80. The tongue is similar to the locking end of the bolt 14 and offers the same locking action with the bonnet 18' and lock 16'. The locking components may also be used to advantage in other locking devices.

Referring now to FIG. 10 of the drawings there is illustrated another modification of the invention and in this embodiment a leg 20'' of a shackle, such as in FIG. 1, is provided with a bonnet 18'' in which an integral dial type combination lock 86 is provided in place of the key-operated lock of the principal embodiment. The bonnet 18'' may be tapered and extended to the end of the leg to provide a streamlined contour able to easily deflect blows by a hammer.

In the embodiment of FIG. 11 a magnetic lock is provided in a bonnet 18'''. Such locks can be actuated only by a specific magnetic key 88 having pre-positioned magnetic elements embedded in a disc which is placed on the bonnet at a particular position and turned.

Referring now to FIGS. 12 and 13 there is illustrated yet another modification of the invention and, in this embodiment, a lock mechanism 90 is comprised of an outer U-shaped shackle 92, similar to that of the principal embodiment, a separate inner U-shaped shackle 94 and a bolt 96. The outer shackle 92 and bolt 96 may be similar to those shown in FIGS. 1 through 8, 10 or 11, or may be similar to those disclosed in co-pending application Ser. No. 241,683. In any event, the inner shackle is slightly smaller than the outer shackle so that it may nest in the outer shackle for storage and travel when not in use, as shown in FIG. 12. The inner shackle is formed with slots 98 near the ends of both legs and which align with the slots in the legs of the outer shackle so that the bolt 96 may pass through both shackles for locking and unlocking engagement with a lock within a bonnet 100 on the outer shackle 92.

When the lock 90 is to be used, the bolt 96 is first removed and then the inner shackle is separated from the outer shackle. The two shackles are then re-connected in opposing relation as shown in FIG. 13, with one shackle engaging the frame or wheel of a motorcycle, for example, and the other shackle engaging a post or other fixed object. The arrangement effectively lengthens the locking mechanism extending its utility by providing a greater reach between a bicycle, motorcycle or the like and the post or other member to which it is locked.

Referring now to the embodiment of FIGS. 14 and 15, there is shown a flexible metal cable 102 in combination with a lock mechanism 10 of the principal embodiment. The cable 102 is formed with an eye or loop 103 at each end for engagement with the shackle of the lock whereby the lock may be attached to a bicycle, for example, and the cable passed around a tree or other large object. The lock may thus be used where a narrow post is not available. The cable is flexible and sheathed in a relatively soft, flexible plastic sleeve 104. It has been found that a soft, resilient cable is more resistant to the action of bolt cutters than is a hard, stiff, metal rod of corresponding size.

Having thus described the invention, what we claim and desire to obtain by Letters Patent of the United States is:

1. A locking mechanism, comprising
   a. first and second members relatively movable to one another and adapted for locking and unlocking engagement,
   b. said first member including a bolt formed with a pair of openings near one end thereof,
   c. said second member including a hollow bonnet formed with an opening therein and a rotatable lock mounted in said bonnet at said opening,
   d. said lock including a pair of L-shaped cams offset from the axis of rotation of said lock and extending in spaced parallel relation on opposite sides of said lock whereby the ends of said cams will engage said bolt holes when said lock is turned to a locked position.

2. A locking mechanism according to claim 1 wherein said lock includes combination dial actuating means.

3. A locking mechanism according to claim 1 wherein said lock includes precoded magnetic key and cooperating magnetically responsive actuating means.

4. A locking mechanism for bicycles and the like, comprising in combination
   a. a generally U-shaped shackle having a pair of parallel legs each formed with a slot near the end of said legs,
   b. a hollow bonnet mounted on the outer face of one of the said legs and in registration with the slot therein,
   c. said bonnet being formed with an opening in a wall thereof,
   d. locking means movably mounted to said bonnet and in said opening and being substantially fully disposed within said bonnet,
   e. a bolt mountable through said slots to close the end of said shackle,
   f. said bolt formed at one end with at least one opening to engage said locking means and at the other end formed with a stop to limit movement of said bolt through the slot of the other leg, and,
   g. a bracket mountable to the frame of said bicycle, said bracket being formed with a post and said bolt stop is formed with a socket for engagement with said post.

5. A locking mechanism for bicycles and the like, comprising
   a. a generally U-shaped shackle having a pair of parallel legs each formed with a slot near the end of said leg,
   b. a hollow bonnet mounted to the outer face of one of said legs and in registration with the slot therein,
   c. said bonnet being formed with an opening in the wall thereof,
   d. locking means movably mounted to said bonnet and in said opening and being substantially fully disposed within said bonnet,
   e. a bolt mountable through said slots to close the end of said shackle,
   f. said bolt formed at one end with at least one opening to engage said locking means and at the other end formed with a stop to limit movement of said bolt through the slot of the other leg,
   g. said locking means including a rotatable, key-actuated barrel and a pair of spaced, oppositely facing locking cams extending from said barrel,
   h. said bolt being formed with a pair of holes at said one end adapted to lockably receive said cams when said bolt is in position across said shackle and said barrel is in a locked position.

6. A locking mechanism for bicycles and the like, comprising in combination
   a. a generally U-shaped first shackle having a pair of parallel legs each formed with a slot near the end of said leg,
   b. a hollow bonnet mounted to the outer face of one of said legs and in registration with the slot therein,
   c. said bonnet being formed with an opening in the wall thereof,
   d. locking means movably mounted to said bonnet and in said opening and being substantially fully disposed within said bonnet,
   e. a bolt mountable through said slots to close the end of said shackle,
   f. said bolt formed at one end with at least one opening to engage said locking means and at the other end formed with a stop to limit movement of said bolt through the slot of the other leg, and,
   g. a U-shaped second shackle formed with a slot near the end of each leg and dimensioned in one position to nest within said first shackle with all of said slots in registration and in a second position adapted to connect with said first shackle in opposing relation with all of said slots in registration.

7. A locking mechanism according to claim 4 wherein said post and said socket are triangular in cross-section.

8. A locking mechanism according to claim 5 wherein said bolt is formed with a re-entrant notch in said one end, said notch being in the form of a wrench socket whereby said bolt may be employed as a wrench when not connected to said shackle.

9. A locking mechanism according to claim 8 including other re-entrant notches formed in other portions of said bolt and of different sizes.

10. A locking mechanism according to claim 5 wherein said barrel is rotatable about an axis parallel to the length of said bolt, said locking cams each having an L-shaped configuration and offset from the axis of said barrel, the legs of said cams extending in spaced relation parallel to said axis and the ends thereof extending perpendicularly to said legs in opposite but parallel directions.

11. A locking mechanism according to claim 5 in combination with a flexible metal cable formed with a loop at each end thereof engaging said shackle.

12. A locking mechanism according to claim 11 including a resilient flexible ply covering the outer surface of said cable.

* * * * *